(12) United States Patent
Hong et al.

(10) Patent No.: US 8,143,085 B2
(45) Date of Patent: Mar. 27, 2012

(54) DYE-SENSITIZED SOLAR CELL AND METHOD FOR MANUFACTURING THE SAME

(75) Inventors: Byung You Hong, Hwaseong-si (KR); Yong Seob Park, Suwon (KR); Sung Uk Lee, Suwon (KR); Mi Ju Park, Gwangju (KR)

(73) Assignee: Sungkyunkwan University Foundation For Corporate Collaboration, Cheoncheon-Dong, Jangan-Gu, Gyeonggi-Do, Suwon (KR)

( * ) Notice: Subject to any disclaimer, the term of this patent is extended or adjusted under 35 U.S.C. 154(b) by 464 days.

(21) Appl. No.: 12/361,663

(22) Filed: Jan. 29, 2009

(65) Prior Publication Data

US 2009/0194159 A1 Aug. 6, 2009

(30) Foreign Application Priority Data

Jan. 31, 2008 (KR) .................. 10-2008-0010269

(51) Int. Cl.
*H01L 21/00* (2006.01)
(52) U.S. Cl. .............. 438/57; 438/98; 257/E25.009; 136/256
(58) Field of Classification Search .............. 438/29, 438/57, 82, 98, 99; 257/E29.009; 136/256, 136/263
See application file for complete search history.

(56) References Cited

U.S. PATENT DOCUMENTS

| 2002/0097360 A1* | 7/2002 | Kamiya et al. ............. 349/123 |
| 2006/0185714 A1* | 8/2006 | Nam et al. .................. 136/244 |
| 2007/0119498 A1* | 5/2007 | Park et al. .................. 136/256 |
| 2007/0151601 A1* | 7/2007 | Jung et al. .................. 136/263 |
| 2008/0171193 A1* | 7/2008 | Yi et al. ..................... 428/327 |

FOREIGN PATENT DOCUMENTS

JP 05013792 A * 1/1993
KR 10-2006-0033158 4/2006

* cited by examiner

*Primary Examiner* — Brook Kebede
(74) *Attorney, Agent, or Firm* — Lexyoume IP Group, PLLC

(57) ABSTRACT

Provided is a dye-sensitized solar cell. Specifically, the present invention provides a dye-sensitized solar cell which is designed to reduce the production cost, improve productivity and increase energy efficiency by using a carbon electrode as a counter electrode, and a manufacturing method thereof. The dye-sensitized solar cell according to the present invention is characterized by comprising a working electrode, a counter electrode, and an electrolytic layer separating the two electrodes, wherein the counter electrode comprises a carbon electrode formed on a first transparent substrate, wherein the carbon electrode is a conductive transparent carbon electrode. According to the present invention, it is possible to remarkably reduce the production cost by using a relatively low-cost material, i.e. carbon electrode, and improve the solar cell efficiency by preventing oxidation with the electrolytic layer owing to corrosion and oxidation resistance of the carbon electrode.

4 Claims, 3 Drawing Sheets

DYE-SENSITIZED SOLAR CELL AND METHOD FOR MANUFACTURING THE SAME

CROSS-REFERENCE TO RELATED APPLICATIONS

This application claims the benefit of Korean Patent Application No. 10-2008-0010269 filed with the Korean Intellectual Property Office on Jan. 31, 2008, the disclosure of which is incorporated herein by reference in its entirety.

BACKGROUND

1. Technical Field

The present invention relates to a dye-sensitized solar cell, specifically, to a dye-sensitized solar cell which is designed to reduce the production cost, improve productivity and increase energy efficiency, by using a carbon electrode as a counter electrode, and a manufacturing method thereof.

2. Description of the Related Art

As it has been well known in this field of art, a solar cell is a device that converts solar energy into electricity. It uses two types of semiconductors, P type and N type semiconductor for power generation. When placed under the sunlight, electrons and holes are generated in the solar cell, and the generated electrical charges transport to P-type side and N-type side, causing a potential difference between the P-type and N-type side.

In recent years, researches in dye-sensitized solar cells based on the principle of a photosynthetic reaction have been made. Such dye-sensitized solar cell is a novel type of photoelectrochemical solar cells with enhanced energy conversion efficiency by chemically adsorbing photosensitive dye molecules to the surface of a semiconductor material having a large energy bandgap, unlike a silicon solar cell, wherein the photosensitive dye molecules can generate electron-hole pairs when receiving light within the visible light area. Such dye-sensitized solar cells, as compared to conventional solar cells using compound semiconductors, require low manufacturing cost and a simple process, while having another advantage such as being readily applicable to the window of the exterior wall in a building, to a green house made of glass or the like, owing to the use of eco-friendly and transparent electrode. However, such dye-sensitized solar cells still have drawbacks with regard to physical durability and limits in photoelectric transformation efficiency.

As representative dye-sensitized solar cells, there are "photo-electrochemical cells" shown in U.S. Pat. No. 4,927,721 issued on the date of May 22, 1990 to Gratzel et al. (Switzland), and "photovoltaic cells" shown in U.S. Pat. No. 5,350,644 issued on the date of Sep. 27, 1994 to the same applicant.

Such conventional dye-sensitized solar cells comprise a working electrode, a counter electrode and an electrolyte intervened therebetween.

The working electrode comprises a conductive transparent electrode formed on one side of a transparent substrate; a layer of n-type metal oxide semiconductor as a nano-porous membrane formed on the conductive transparent electrode; and a dye layer coated on the titanium oxide layer.

The counter electrode is separated from the working electrode by the electrolytic layer, and made of precious metals such as platinum, palladium, gold, silver and the like by being formed on the other side of the transparent substrate.

By such construction, the dye-sensitized solar cells operate as follows: upon absorption of sunlight, the dye is excited and oxidized, from which electrons are provided to the conduction band of an n-type metal oxide semiconductor layer having a large bandgap. The empty space in the lower energy level made by the loss of electrons therefrom, is again filled with other electrons received from ions in the electrolyte. The ions which gave electrons to the dye move to the counter electrode for receiving electrons. At that time, the counter electrode works as a catalyst in oxidation-reduction reactions of ions in the electrolyte, thereby playing a role of providing electrons to the ions in the electrolyte through oxidation-reduction reactions occurred on the surface (the oxidized dye returns to the ground level as being reduced by obtaining electrons from an electron donor, $I^-$ present in the electrolyte, and the oxidation-reduction medium which was converted to $I_3^-$ by donating electrons to such reaction is again converted to an electron donor, $I^-$ with the help of a counter electrode). For satisfying all the characteristics, conventional dye-sensitized solar cells have mostly used a platinum thin film which has excellent catalyst activity, as a counter electrode. Other than platinum, precious metal species which have similar characteristics to platinum have been used for the metal electrode, for example palladium, gold and silver.

However, the conventional dye-sensitized solar cells require high production cost owing to the use of a precious metal electrode such as platinum which has relatively high electroconductivity and excellent catalyst properties, as a counter electrode. Further, they have limitations on increasing the surface area for catalytic reactions being occurred.

When it is intended to use an insulating substrate, for example ceramic as a transparent substrate, a counter electrode should have more thickness in order to satisfy the demanded electroconductivity, therefore it requires the use of expensive equipment such as a large sputtering system or involves in a screen printing method for the manufacture, thus increasing the manufacturing cost, i.e. posing a problem of remarkable decrease in economic efficiency. Particularly, parameters such as the surface area and volume of a counter electrode have a significant relation with the rate of a catalyst reaction.

SUMMARY

Considering the above-described conventional problems of prior arts, the present invention has been designed to provide a dye-sensitized solar cell which can embody reduction of production cost, a simplified manufacturing process, an improvement in productivity, and an increase in energy efficiency, by using a carbon electrode as a counter electrode which is relatively low in cost, as well as a method for manufacturing the same.

The present invention is to further provide a method for a dye-sensitized solar cell which can mass-produce large area electrodes by forming a carbon electrode used as a counter electrode onto the surface of a transparent substrate.

In order to achieve the above-described objects, a dye-sensitized solar cell of the present invention includes a working electrode, a counter electrode and an electrolytic layer separating the two electrodes, and is characterized in that the counter electrode comprises a carbon electrode formed on a first transparent electrode, wherein the carbon electrode is a conductive transparent carbon electrode.

By using a low-cost carbon electrode as a counter electrode, the present invention can significantly reduce the production cost as well as improve the solar cell efficiency by preventing oxidation with the electrolytic layer owing to corrosion and oxidation resistance of the carbon electrode.

The first transparent substrate is characteristically, any one of glass, silicon and flexible materials.

The carbon electrode may be characterized by having 85% transparency and $3 \times 10^2$ [$\Omega^{-1} cm^{-1}$] conductivity, wherein the thickness of thin film thereof is 180±10 nm.

The working electrode includes a conductive transparent electrode deposited on one side of a second transparent substrate; a porous electrode deposited on the conductive transparent electrode; and a dye layer deposited on the porous electrode.

A method for manufacturing a dye-sensitized solar cell of the present invention is characterized by including a step of forming a carbon electrode in the form of a thin film on the first transparent substrate, wherein the carbon electrode is a conductive transparent carbon electrode.

In the step of forming a carbon electrode, the counter electrode is characteristically formed by being deposited at a low temperature by a sputtering process that uses plasma.

Vapor deposition of a carbon electrode is characteristically conducted by injecting argon (Ar) and helium (He) at the ratio of 9:1, and applying DC bias with a pulse under the deposition pressure of $5 \times 10^{-3}$ Torr, thereby generating a plasma. The deposition is performed at 30° C. for 6 minutes.

When depositing the carbon electrode, a plasma is characteristically formed by using DC bias power with a pulse, under the deposition pressure of $5 \times 10^{-3}$ Torr.

The present invention as described above, has an advantage such that an electrochemical reaction is easily carried out by using a carbon electrode as a counter electrode, increasing the area contacting with electrons. The carbon electrode according to the present invention can further improve the solar cell efficiency since it does not cause an oxidation reaction with electrolytes owing to its characteristics such as corrosion or oxidation resistance.

Still further, the present invention has been designed to reduce the time for manufacture and production cost, and to simplify the manufacturing process, making it possible to increase mass production of solar cells in convenient way, by depositing a carbon electrode as a counter electrode on the surface of a transparent substrate through a sputtering process.

Still further, in the present invention, various materials including flexible materials such as polyimide (Kapton), polyethylenenaphthalate (PEN), polyester (PET) or the like, other than silicon or glass, can be easily applied as a transparent substrate, since a carbon electrode can be easily formed at a low temperature on the surface of the transparent substrate. Particularly, when using a flexible material as a transparent substrate, flexibility can be easily introduced into a solar cell.

The carbon electrode of the present invention has excellent adhesiveness with a substrate, high elastic modulus, and good maintenance of a soft surface, having excellent protection quality, therefore it is possible to extend the overall lifetime of the solar cell and improve characteristics of an element.

DETAILED DESCRIPTION

Hereinafter, preferred examples of the present invention are illustrated in detail with a reference of the figures attached hereto.

Figure 1:
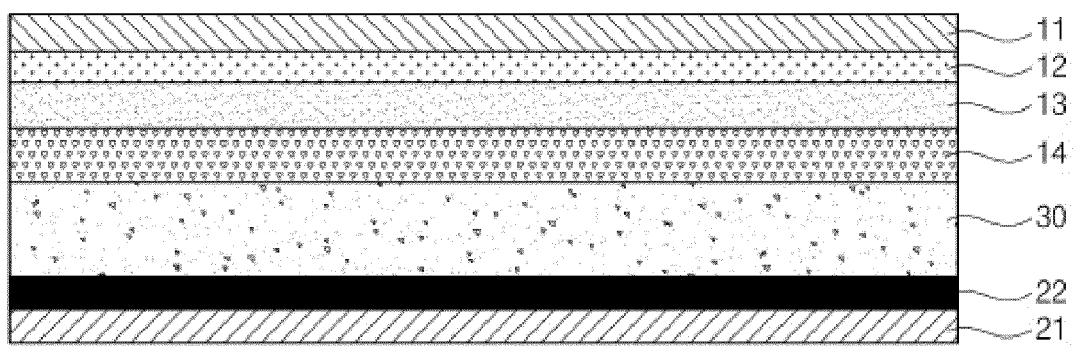
FIG. 1 is a cross-sectional view of a dye-sensitized solar cell according to one embodiment of the present invention.
Figure 2:
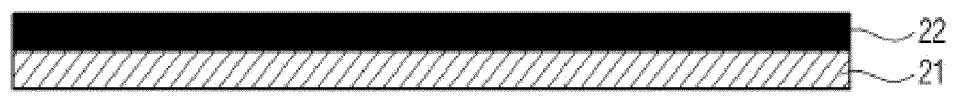
FIG. 2 is a view illustrating a process forming a counter electrode of a dye-sensitized solar cell according to the present invention.

FIGS. 1 and 2 are views disclosing a dye-sensitized solar cell of the present invention.

As it is shown, the dye-sensitized solar cell(100) of the present invention comprises a working electrode(10) of the present invention, a counter electrode(20), and an electrolytic layer(30) intervened between the working electrode(10) and a counter electrode(20).

The counter electrode(20) includes a transparent conductive carbon electrode(22) deposited on one side of a first transparent substrate(21), wherein the carbon electrode(22) is deposited on the other side of the first transparent substrate layer(21) as a thin film.

The carbon electrode(22) which is not a chemically synthesized material, can be easily deposited on the surface of the first transparent substrate(21) at a low temperature by a sputtering process that uses plasma. It has an advantage that a mass amount of large area electrodes can be relatively easily manufactured. As such, the carbon electrode can be very easily manufactured owing to vapor deposition of a carbon electrode(22) in the form of a thin film to the first transparent substrate(21) at a low temperature by plasma assisted chemical vapor deposition of a sputtering process, and it has a great economic benefit owing to the use of carbon that is a relatively low cost material, causing reduction in production cost.

Further, the carbon electrode(22) does not cause an oxidative reaction with the electrolytic layer(30) due to its characteristics such as corrosion resistance and oxidation resistance, being capable of further increasing the solar cell efficiency. Still further, since the carbon electrode(22) has high elastic modulus, a soft surface and excellent adhesiveness, it has high protection quality, being capable of extending the overall lifetime of the solar cell, advantageously.

As described above, the carbon electrode(22) can be easily vapor deposited at a low temperature, therefore it has a further advantage that it has a wide selection of materials for the first transparent substrate(21), i.e. it can be used on various kinds of first transparent substrate materials. For example, let alone conventionally used glass or silicon, flexible materials such as polyimide (Kapton), polyethylenenaphthalate (PEN), polyester (PET) and the like can be readily used. If a transparent substrate with flexibility is applied, it would be possible to introduce flexibility to solar cells.

Preferably, the carbon electrode(22) is characterized by having 85% transparency and $3 \times 10^2$ [$\Omega^{-1} cm^{-1}$] conductivity, and the thickness of thin film thereof is 180±10 nm. By such characteristics, it is possible to maximize the solar cell efficiency.

As for a working electrode(10), various working electrodes having many different structures generally used in a dye-sensitized solar cell can be applicable.

Preferably, the working electrode(10) includes a conductive transparent electrode(12) deposited on a second transparent substrate(11), a porous electrode(13) deposited on the conductive transparent electrode(12), and a dye layer(14) deposited on the porous electrode(13)

The conductive transparent electrode(12) is included of ITO(Sn-doped $In_2O_3$), FTO(F-doped $SnO_2$), ZnO and the like, and supports the porous electrode(13).

The porous electrode(13) is included of n-type metal oxide semiconductors present in the form of a nano-porous membrane such as $TiO_2$, $SnO_2$ and the like.

The dye layer(14) is adsorbed and deposited on the porous electrode(13), being adjacent to the electrolytic layer(30).

The method for manufacturing a dye-sensitized solar cell according to the present invention is characterized in that the formation of a counter electrode(20) is conducted by depositing a carbon electrode(22) in the form of a thin film at a low temperature through a sputtering process that uses plasma. The carbon electrode(22) is formed on the other surface of the first transparent substrate(21) as illustrated in FIG. 2.

For vapor deposition of the carbon electrode(22), a magnetron sputtering process is used. In order to deposit the carbon electrode(22) as a thin film in a magnetron sputtering device, pulsed DC power is used as a plasma source, and a permanent magnet is used as a magnetron source, wherein the magnet has asymmetrically formed N pole and S pole and its size is 4 inches. By using a pulsed DC plasma source, a carbon electrode(22) is deposited in the form of a thin film.

The deposition process of the carbon electrode(22) is a described below.

Firstly, argon(Ar) and helium(He) at the ratio of 9:1 are simultaneously injected together at each flow rate of 65 sccm and 9 sccm, establishing a deposition pressure. Under the established pressure, $5 \times 10^{-3}$ Torr, pulsed DC power is applied to form a plasma, by which a thin film is deposited. Simultaneously, −50V DC bias is applied for inducing nano-crystallization in the thin film. The deposition is conducted to form a thickness of 180±10 nm at 30° C. for 6 minutes.

As described above, in the present invention, a carbon electrode(22) is deposited at a low temperature in the form of a thin film, through a sputtering process that uses plasma. Therefore, it is possible to remarkably reduce the time taken for a counter electrode(20) process, while having high deposition rate by adjusting the plasma density, as well as to save the production cost. Particularly, owing to the characteristics of the carbon electrode(22) such as corrosion and oxidation resistance, an oxidative reaction with an electrolytic layer(30) is prevented. Accordingly, the present invention can effectively increase the solar cell efficiency. Further, owing to high elastic modulus, soft surface and excellent adhesiveness of the carbon electrode(22), protective quality thereof is superior. Therefore, it is possible to contribute to extension of life span and maintenance of solar cells.

Figure 3:
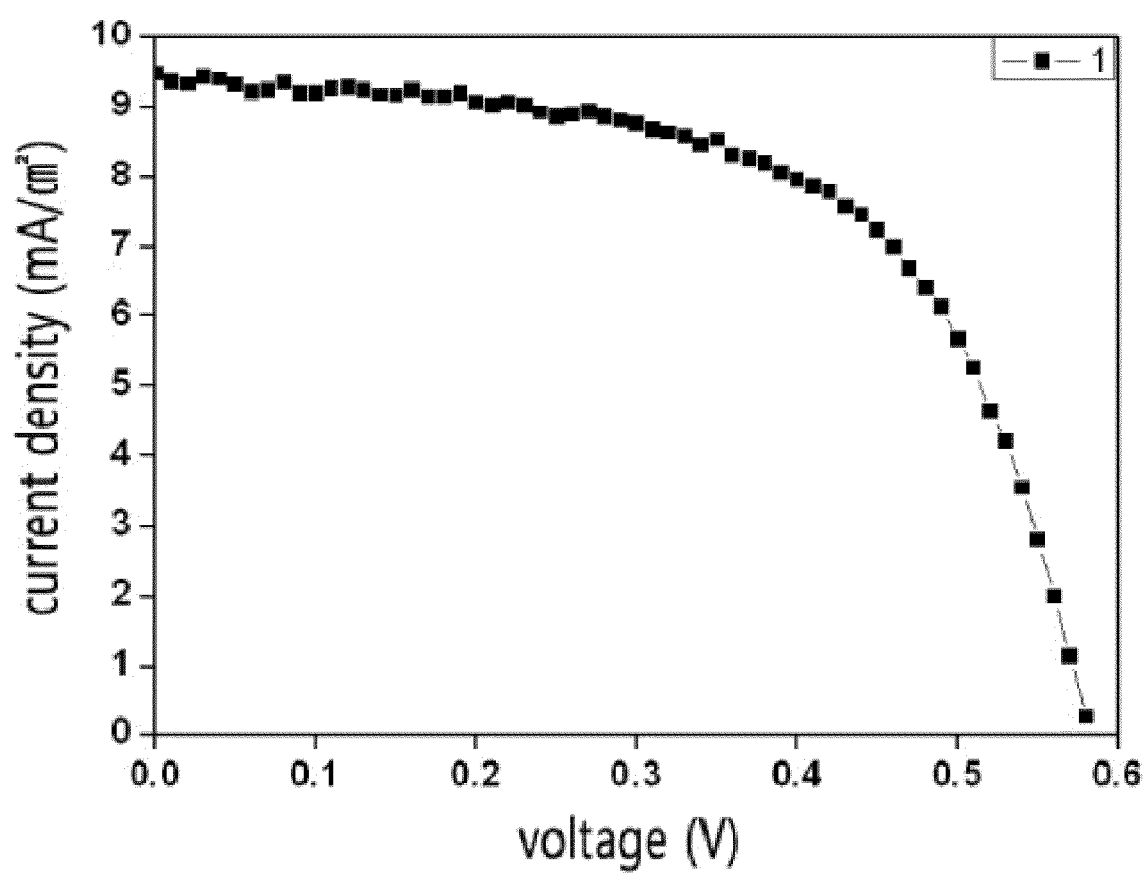
FIG. 3 is a graph showing a J-V characteristics of a dye-sensitized solar cell according to the present invention, wherein J and V represent a current density and voltage, respectively.

FIG. 3 is a graph showing characteristics of a dye-sensitized solar cell according to the present invention in relation to a current density and voltage (J-V), wherein the open circuit voltage (Voc) is 0.57V, and the short circuit current (Jsc) is 9.72 mA/cm². From the results, it was found that a high open circuit voltage and short circuit current could be obtained from the present invention.

Figure 4:
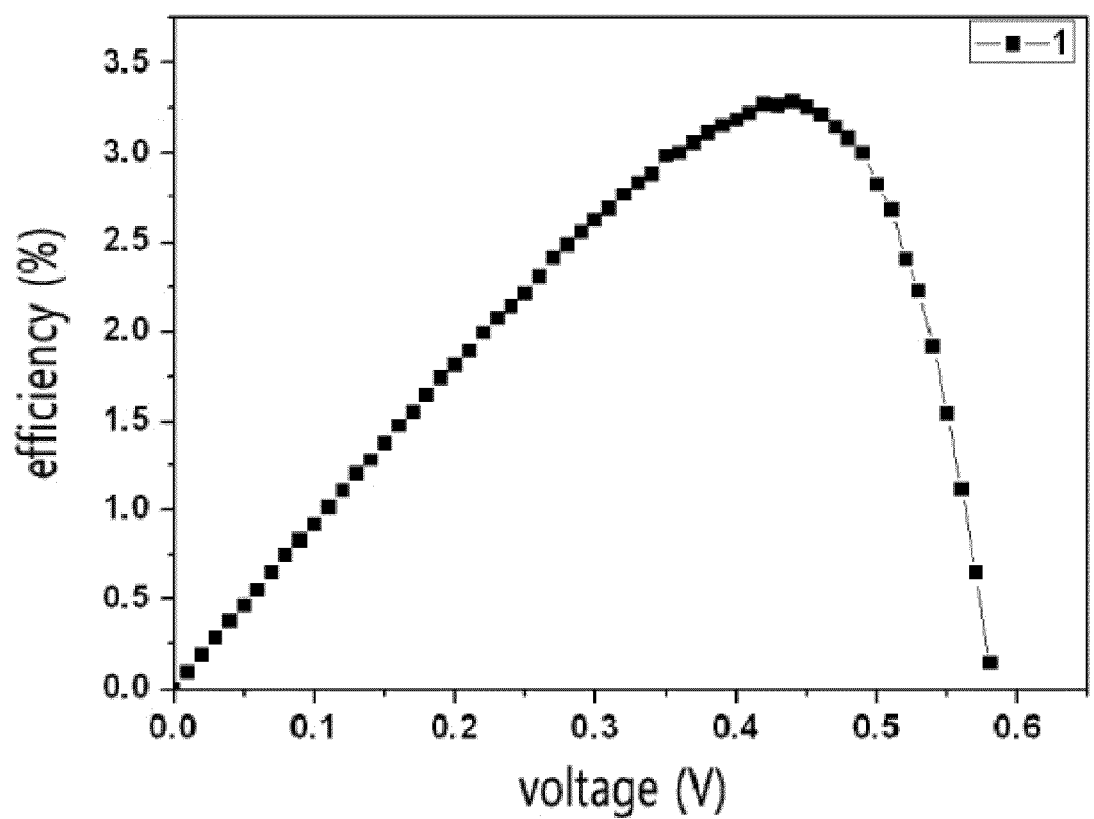
FIG. 4 is a graph showing efficiency of a dye-sensitized solar cell according to the present invention.

FIG. 4 is a graph showing efficiency of a dye-sensitized solar cell according to the present invention. From the figure, it can be known that a fill factor (the ratio of the value of $V_{mp} \times J_{mp}$ divided by the value of $V_{oc} \times J_{sc}$, wherein $V_{mp}$ and $J_{mp}$ are the voltage and current density at the maximum power point, and $V_{oc}$ and $J_{sc}$ are the open circuit voltage and short circuit current density) is 40%; and the efficiency (η, the ratio of the maximum power to the incident irradiance energy ($P_{in}$) is 2.22%. As seen from the above, it is further known that a very good fill factor and efficiency can be obtained from the present invention.

What is claimed is:

1. A method for manufacturing a dye-sensitized solar cell comprising: providing a working electrode, a counter electrode and an electrolytic layer separating the working electrode and the counter electrode, wherein the counter electrode includes a transparent substrate; and forming a conductive transparent carbon electrode in the form of a thin film on the transparent substrate, wherein the conductive transparent carbon electrode is formed by a sputtering technique using unbalanced magnetron sputter of a DC plasma by placing the transparent substrate in a deposition chamber, injecting argon (Ar) and helium (He) into the deposition chamber at the ratio of 9:1, and depositing the conductive transparent carbon electrode at a deposition pressure of $5 \times 10^{-3}$ Torr at 30° C. for 6 minutes.

2. The method for manufacturing a dye-sensitized solar cell according to claim 1, wherein forming the conductive transparent carbon electrode further comprises forming a plasma using pulsed DC bias power.

3. The method of claim 1, wherein the conductive transparent carbon electrode has a conductivity of 300 $\Omega^{-1}cm^{-1}$.

4. The method of claim 1, wherein the conductive transparent carbon electrode is formed in a magnetron sputtering device wherein:
   pulsed DC power is used as a plasma source; and
   a permanent magnet having asymmetrically formed North and South poles is used as a magnetron source.

* * * * *